UNITED STATES PATENT OFFICE.

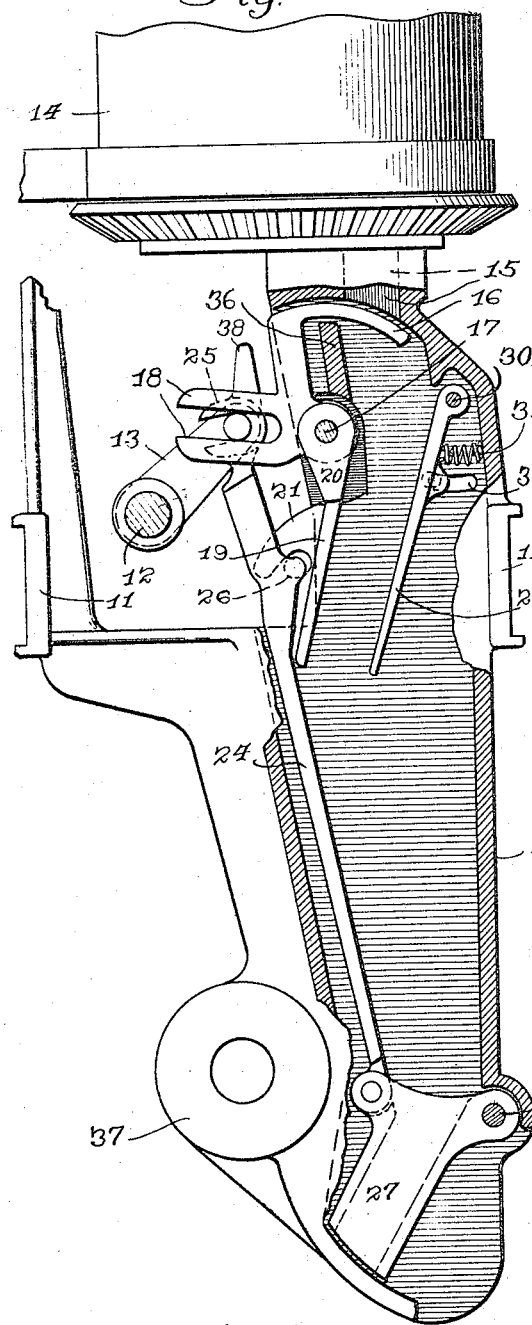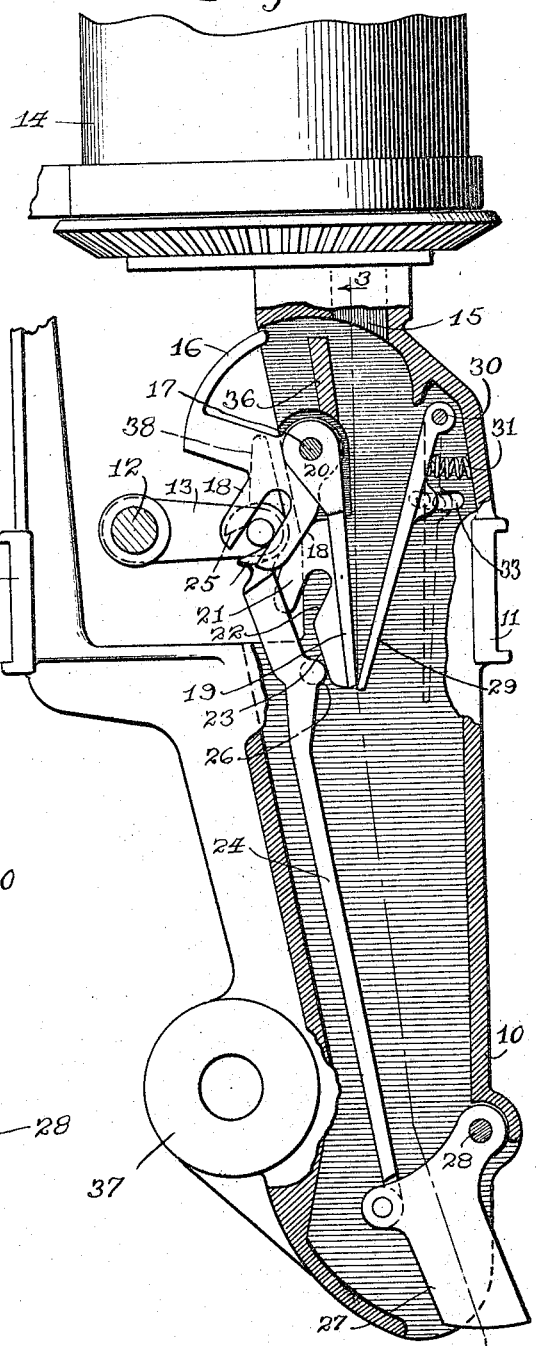

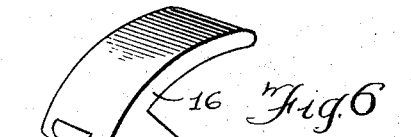
E. E. ENGLUND.
CORN PLANTER.
APPLICATION FILED NOV. 15, 1916.
1,216,788.
Patented Feb. 20, 1917.
2 SHEETS—SHEET 2.
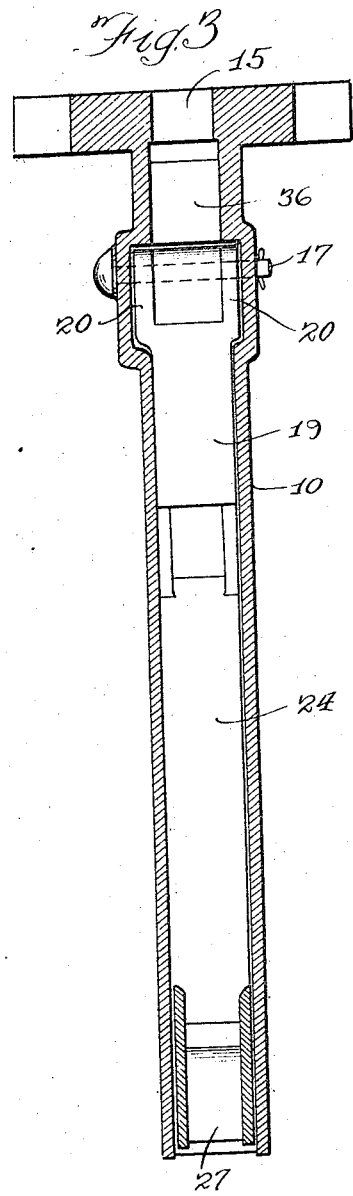
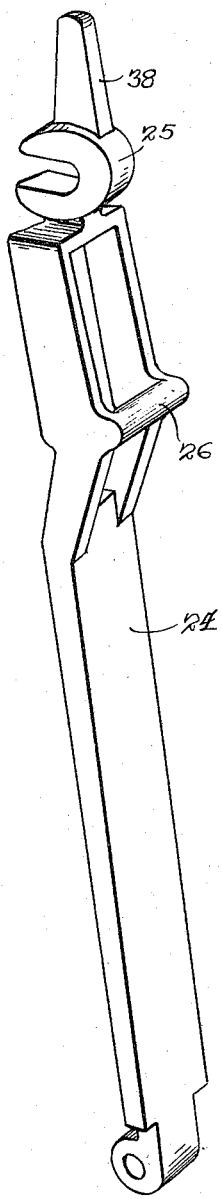
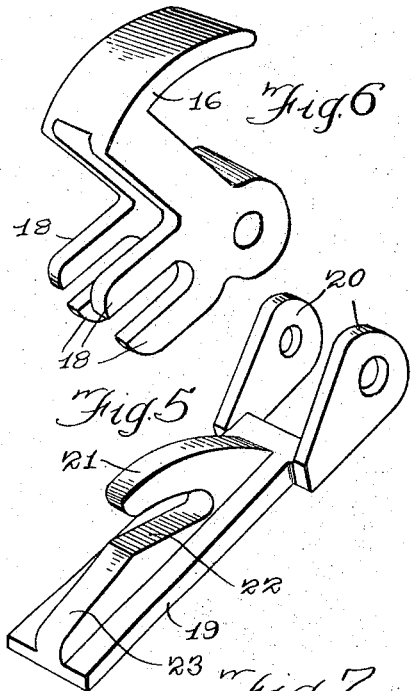
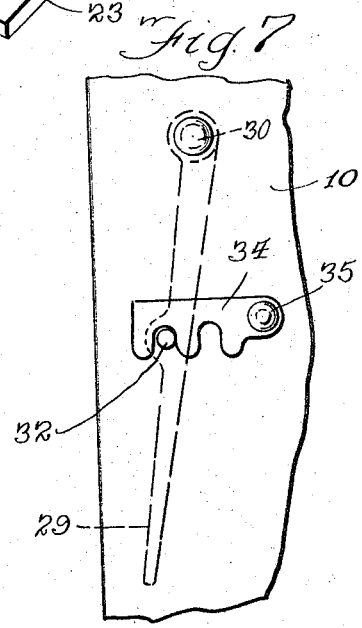
Witness:
L. B. Graham
Inventor
Ernst E. Englund
By Adams Jackson
Attys.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

CORN-PLANTER.

1,216,788.   Specification of Letters Patent.   Patented Feb. 20, 1917.

Application filed November 15, 1916. Serial No. 131,531.

*To all whom it may concern:*

Be it known that I, ERNST E. ENGLUND, a citizen of the United States, and a resident of Moline, in the county of Rock Island and State of Illinois, have invented certain new and useful Improvements in Corn-Planters, of which the following is a specification, reference being had to the accompanying drawings.

This invention relates to corn-planters and particularly to the mechanism within the shanks attached to the front frame of the machine, which mechanism controls the passage of seed through the shank from the time it is received from the hopper at the upper end of the shank until it is discharged at the lower end of the shank. In my former Patent No. 811,554, dated February 6th, 1906, is shown a mechanism for this purpose. It is the object of the present invention to provide improved and simplified means for catching and holding a charge of corn intermediate the top and bottom valves so as to insure against the charge in the lower valve being added to inadvertently to the extent of an extra grain or two when the machine is used as a check-rower, and which mechanism can be so adjusted as to permit of the free passage of corn through the shank when the machine is desired to be changed from a check-rower to a drill. I accomplish this object as shown in the drawings and as hereinafter particularly described.

In the drawings,—

Figure 1 is a view showing in vertical section the hollow shank and in side elevation the valve-mechanism contained therein, and showing also a portion of the front frame of the machine and the hopper from which corn is delivered to the shank;

Fig. 2 is a similar view but showing the parts in the position they assume when a charge of corn is dropped;

Fig. 3 is a vertical section taken at line 3—3 of Fig. 2;

Fig. 4 is a detail, being a perspective view of the pivoted bar through the downward movement of which a charge of corn is ejected from the lower valve to the ground and which at the same time causes a swinging arm to move to effect a trapping of another charge of corn intermediate the upper and lower valves;

Fig. 5 is a detail, being a perspective view of the swinging arm that is moved by the bar shown in Fig. 4;

Fig. 6 is a detail, being a perspective view of the upper valve; and

Fig. 7 is a detail of locking means employed in converting the device from a hill-dropper to a drill.

Referring to the several figures of the drawings, in which corresponding parts are indicated by like reference characters,—

10 indicates a hollow shank suitably connected with the front frame of a corn-planter,—a portion of such frame being indicated by 11. Two such shanks will be employed, of course, one at each side of the frame, the mechanism in each being exactly the same, and such mechanism being adapted to be operated through the medium of the usual transversely-arranged rock-shaft 12 that has secured to it two cranks, such as 13, a crank being employed in connection with the mechanism in each shank. I have not shown any means for intermittently rocking the shaft 12, but it will be understood that such rocking is effected in the usual way by the contact of a check-row fork with the tappets on a check-row wire, the fork and shaft being in each instance thereafter returned to normal position by means of a spring, as shown in my said patent, for example. Such means are, of course, well understood by those skilled in the art and are therefore not here illustrated. Over each hollow shank is located a hopper 14, supported in any well-known manner, and containing seed-measuring and delivering devices of ordinary construction and operated in any usual manner. 15 indicates a passage at the upper end of the shank through which the corn passes from the hopper.

16 indicates the upper valve mounted on the pivot 17. The upper face of this valve is curved and in normal position closes the lower end of the discharge passage 15. Between its curved acting face and its hub portion through which its pivot 17 passes it is slotted, and from each of its side members, that are thus formed by so slotting it, projects forwardly a forked or bifurcated ear, such ears being parallel with each other (see Fig. 6). These ears are indicated by 18. 19 indicates an arm having ears 20 at its upper end that embrace the hub portion of the upper valve 16 and are pivotally secured in place by the same pivot 17 that such valve is mounted upon. On the forward face of this arm is a downwardly-projecting lug 21 and on the face of the arm and in the same vertical plane as the lug 21 is a longitudinal rib having two cam faces 22 and 23 formed by giving to the edge of the rib two inclines—each incline sloping downward toward one end of the rib.

24 indicates a bar, preferably cast, lying adjacent to the inner face of the front inclined wall of the shank. At its upper end portion it is provided with a slotted head 25, the open end of the slot being directed toward the front of the machine. Such slotted head lies between the ears 18 of the upper valve, and through the slot in such head and the slots in the ears 18 passes the horizontal member of the crank 13. Below the slotted head 25 the bar 24 down to about opposite the lower end of the arm 19 is widened compared with the lower part of the arm, and through such widened portion from front to rear is a large opening, as clearly shown in Fig. 4. Connecting the side members of this enlarged and open part of the bar is a cross-piece 26 located at the rear edges of such side members and intermediate the ends of the said opening. Below the cross-piece the rear edges of the said side members are inclined forwardly. At its lower end the bar 24 is pivotally attached to a rocking spout 27 pivotally attached at 28 to the side walls of the shank near the lower end of such shank. When in its normal position the lower end of such spout is closed by a curved end portion of the shank, as shown, thus effectually retaining at that point a charge of seed ready to be deposited in the ground.

29 indicates a plate movably mounted on a pivot 30, such plate being located a short distance in rear of the arm 19, and adapted, when such arm is forced back, as hereinafter described, to catch and temporarily retain a charge of corn passing through the shank. The plate is normally held pressed to the limit of its forward movement by a coiled spring 31 interposed between it and the rear wall of the shank. A pin 32 attached to the plate and passing through a slot 33 controls the extent of forward movement of the plate by reason of contacting with the end of such slot. A latch 34 pivoted at 35 to the outer face of the side wall of the shank adjacent to such slot can be employed to hold the plate retracted, as indicated in dotted lines in Fig. 2, when the planter is employed as a drill. The latch can also be employed to lock the plate in its operative position, if desired, but it need not ordinarily be so used as the spring is sufficient for that purpose, and the spring also serves, by slightly yielding, to relieve the parts 19 and 29 of strain and jar when they are forced into contact at each operation of the check-row mechanism. 36 indicates a small fixed wall extending between the sides of the shank and located between the under face of the curved top of the valve 16 and the pivot 17 of such valve. It serves to insure the proper descent of the corn in its dropping from the face of the valve as such valve is rocked.

37 indicates bearings, formed with the shank at the lower end and on opposite sides thereof, for the attachment of a pair of disk ground-openers. Any other usual ground-openers may, of course, be employed.

The operation of my improved devices is as follows: Assuming that the corn to be planted is to be deposited in hills and that the rock-shaft 12 will be intermittently rocked in the ordinary manner by reason of the usual fork that is rigidly connected thereto coming in contact with the tappets on the check-row wire, the effect of each rocking movement of the shaft 12 on the mechanism here shown and described will be to so turn the crank 13 as to cause a simultaneous movement of the upper valve 16, the bar 24 and the arm 19. In this movement the valve 16 is swung on its pivot 17 in such manner as to withdraw its curved upper wall from beneath the passage 15, thereby allowing the grains that have been deposited on such valve to drop. The bar 24 is at the same time forced down and as it moves it performs a dual function, in that it causes a swinging of the arm 19 so that its lower end contacts the lower end of the plate 29, and it also causes the spout 27 to turn on its pivot 28 sufficiently to uncover its open lower end and sweep the grains that may be confined therein to the ground. At the beginning of the rearward swing of the bar 24 the cross-piece 26 thereof which had been resting against the front face of the arm 19 at the upper end of the incline or cam surface 22, moves down such cam surface and of course causes such arm to turn on its pivot, and by the time the cross-piece has reached the highest point on the double-inclined rib the free end of the arm will be in contact, or very nearly so, with the free end of the plate 29. Upon the continued downward movement of the bar it will tend also to move bodily backward owing to the continued movement in that direction of the crank arm on which it is pivoted and also due to the movement in that direction of the spout 27 to which it is pivoted. By reason of such downward and backward movement the cross-piece 26 of the bar follows along the other incline or cam face 23 and presses the end of the arm 19 forcibly against the plate 29, thus forming for an instant an intermediate valve adapted to receive the grains of corn that had just been dropped from the top valve and retain them while the discharge of the corn then being held in the lower valve is being effected. Of course the movement thus described is made very quickly, and I have found the provision of the spring 31 very effective for cushioning the blow of the arm against the plate and thus avoiding shocks and jars that would tend to impair the devices. On the reverse movement of the parts to bring them back to normal position (which will be accomplished as usual by a coiled spring acting on the rock-shaft as set forth in my said former patent), the cross-piece 26 will travel up the lower incline or cam surface 23 and just about as it reaches the upper end of such incline it will strike the under edge of the downwardly-projecting lug 21 and be forced in between such lug and the incline or cam surface 22. As it travels toward the upper end of such incline it, of course, bears against the curved under edge of the lug and necessarily causes the arm 19 that carries such lug to swing away from the plate 29. This releases the intermediate charge of corn, which falls into the spout 27 which at that time has been drawn back over the curved lower surface of the bottom of the shank. The upper valve has also been swung back under the passage 15. As the bar in its upward movement causes a swing of the arm 19 away from the plate 29, as just described, the lug 21 will project into the opening in the bar above the cross-piece 26 and the cam-shaped rib will enter the opening in the bar below such cross-piece, thereby permitting the parts 19 and 24 to lie closely together and with the cross-bar 26 in contact with the upper end of the cam section 22 ready for the next operation. At the upper end of the bar 24 I have provided a rigid finger 38 which, by bearing against the hub of the upper valve during a portion of the movement of the mechanism, will serve as a guide to direct the slotted head 25 from contact with such valve-hub.

By my improved mechanism I have provided very simple and effective means for controlling the discharge of successive charges of corn through the hollow shank of a planter when the same is used for planting in hills. Such mechanism also lends itself readily to drill planting, for when such method of planting is desired, all that is necessary to be done is to lock back the plate 29 into the position shown by dotted lines in Fig. 2,—this being done by the latch 34,—and tying back the tappet-engaging fork, as will be well understood. The parts will then be in position for drilling.

That which I claim as my invention, and desire to secure by Letters Patent, is,—

1. In a corn-planter, the combination with a hollow shank having openings at its upper and lower ends for admitting and discharging grains, of valves for controlling such openings, means comprising a bar for connecting said valves so that they will move simultaneously, a pivoted arm in the rear of said bar, said bar and arm being in constant engagement with each other, a plate in the rear of said arm with which said arm is adapted to be forced in contact to form a trap for grain falling from the upper valve, and means for moving said bar and said upper and lower valves and forcing said arm against said plate.

2. In a corn-planter, the combination with a hollow shank having openings at its upper and lower ends for admitting and discharging grains, of valves for controlling such openings, means comprising a bar for connecting said valves so that they will move simultaneously, a pivoted arm in the rear of said bar, said bar and arm having parts that are normally loosely interengaged with each other, a plate in the rear of said arm with which said arm is adapted to be forced in contact to form a trap for grain falling from the upper valve, and means for moving said bar and said upper and lower valves and forcing said arm against said plate.

3. In a corn-planter, the combination with a hollow shank having openings at its upper and lower ends for admitting and discharging grains, of valves for controlling such openings, means comprising a bar for connecting said valves so that they will move simultaneously, a pivoted arm in the rear of said bar, a cam-shaped projection on one of such last-named parts with which the other part engages so that upon the downward movement of the bar such arm will be forced back, a plate in the rear of said arm with which said arm is adapted to be forced in contact to form a trap for grain falling from the upper valve, and means for moving said bar and said upper and lower valves and forcing said arm against said plate.

4. In a corn-planter, the combination with a hollow shank having openings at its upper and lower ends for admitting and discharging grains, of valves for controlling such openings, means comprising a bar for connecting said valves so that they will move simultaneously, a pivoted arm in the rear of said bar, a cam-shaped projection on one of such last-named parts with which the other part engages so that upon the downward movement of the bar such arm will be forced back, a spring-pressed plate in the rear of said arm with which said arm is adapted to be forced in contact to form a trap for grain falling from the upper valve, and means for moving said bar and said upper and lower valves and forcing said arm against said plate.

5. In a corn-planter, the combination with a hollow shank having openings at its upper and lower ends for admitting and discharging grains, of valves for controlling such openings, means comprising a bar for connecting said valves so that they will move simultaneously, a pivoted arm in the rear of said bar, the face of said arm adjacent to the bar being provided with a cam surface and a lug that projects toward said bar, and said bar having means for engaging such cam surface to cause a rearward movement of the arm when the bar is moved downward and for engaging such lug to cause a forward movement of the arm on the upward movement of the bar, a plate in the rear of said arm with which said arm is adapted to be forced in contact to form a trap for grain falling from the upper valve, and means for moving said bar and said upper and lower valves and forcing said arm against said plate.

6. In a corn-planter, the combination with a hollow shank having openings at its upper and lower ends for admitting and discharging grains, of valves for controlling such openings, means comprising a bar for connecting said valves so that they will move simultaneously, said bar having an opening therein in its upper portion and a cross-piece extending across said opening, a pivoted arm in the rear of said bar, the face of said arm adjacent to the bar being provided with a cam surface and a lug that projects toward said bar, the cross-piece of the bar engaging such cam to cause a rearward movement of the arm when the bar is moved downward and engaging such lug to cause a forward movement of the arm when the bar moves upward, a plate in the rear of said arm with which said arm is adapted to be forced in contact to form a trap for grain falling from the upper valve, and means for moving said bar and said upper and lower valves and forcing said arm against said plate.

7. In a corn-planter, the combination with a hollow shank having openings at its upper and lower ends for admitting and discharging grains, of valves for controlling such openings, means comprising a bar for connecting said valves so that they will move simultaneously, said bar having an opening therein in its upper portion and a cross-piece across said opening, a pivoted arm in the rear of said bar, the face of said arm adjacent to the bar being provided with two oppositely-directed inclines and a lug above said inclines and projecting toward said bar, the cross-piece of the bar normally resting between the upper one of the inclines and the lug, and adapted to move in contact with both inclines when said bar is moved downward to cause a rearward movement of the arm and to engage said lug to cause a forward movement of the arm when the bar moves upward, a plate in the rear of said arm with which said arm is adapted to be forced in contact to form a trap for grain falling from the upper valve, and means for moving said bar and said upper and lower valves and forcing said arm against said plate.

ERNST E. ENGLUND.